United States Patent
Alme

(10) Patent No.: US 9,727,710 B2
(45) Date of Patent: *Aug. 8, 2017

(54) SYSTEM AND METHOD FOR LIMITING SPYWARE ACTIVITY

(71) Applicant: McAfee Inc., Santa Clara, CA (US)

(72) Inventor: Christoph Alme, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/819,884

(22) Filed: Aug. 6, 2015

(65) Prior Publication Data

US 2015/0379246 A1 Dec. 31, 2015

Related U.S. Application Data

(63) Continuation of application No. 11/736,981, filed on Apr. 18, 2007, now Pat. No. 9,130,974.

(51) Int. Cl.
*G06F 21/16* (2013.01)
*H04L 29/06* (2006.01)
*G06F 17/30* (2006.01)

(52) U.S. Cl.
CPC ........ *G06F 21/16* (2013.01); *G06F 17/30887* (2013.01); *H04L 63/14* (2013.01); *H04L 63/1466* (2013.01); *H04L 63/1483* (2013.01)

(58) Field of Classification Search
None
See application file for complete search history.

(56) References Cited

U.S. PATENT DOCUMENTS

2003/0051142 A1* 3/2003 Hidalgo .................. H04L 63/04
 713/176
2004/0054779 A1* 3/2004 Takeshima ........ G06F 17/30569
 709/225

* cited by examiner

*Primary Examiner* — Brandon Hoffman
(74) *Attorney, Agent, or Firm* — Blank Rome LLP

(57) ABSTRACT

A system and method of detecting and limiting unsolicited data uploads. Downloaded content such as web pages and emails are scanned for web forms and/or links. A watermark is added where appropriate and the modified downloaded content is forwarded to the person who requested the content. A check is made to determine whether information received from a user includes appropriate watermarks. If so, the watermark is removed and the information is forwarded to its destination.

25 Claims, 4 Drawing Sheets

SYSTEM AND METHOD FOR LIMITING SPYWARE ACTIVITY

TECHNICAL FIELD

The present invention is related to computer network security, and more particularly, to a system and method for limiting the activity of undesired programs.

BACKGROUND ART

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

The ability of such programs to communicate with the outside world via an outbound connection can be limited in some cases. For instance, on some non-Web-typical ports, such communications can be blocked at the transport layer. Other non-Web-typical protocols can be blocked at the application layer. Outbound connections established as cookies in HTTP requests can be blocked by a cookie filter.

But when malicious program code such as Adware or Spyware sends back this data embedded into an HTTP data upload request, e.g. an HTTP POST request or an HTTP GET request with the uploaded data embedded as parameters into the Request URI, this upload is not distinguishable from a regular HTTP data upload request, such as, for example, when using a Search form on a web page.

One approach to preventing the transfer of data embedded into an HTTP data upload request would be to "brute force" block all HTTP POST requests. Such an approach would, by its nature, result in a large number of false-positives. In addition, such an approach would break a number of Web forms, significantly degrading the web browsing experience for users.

As noted above, an HTTP GET request can be used to transfer data embedded as parameters into the Request URI. To block this approach one would have to use a URL filter to block HTTP GET requests to suspicious sites. This is, however, a reactive measure. To prevent uploads to newly registered Ad-/Spyware home server domains, a user/customer would have to also deny access to uncategorized web sites, further degrading the user experience.

What is needed is a system and method for limiting the ability of spyware, adware and malware programs to communicate effectively with remote computers or servers.

DESCRIPTION OF EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
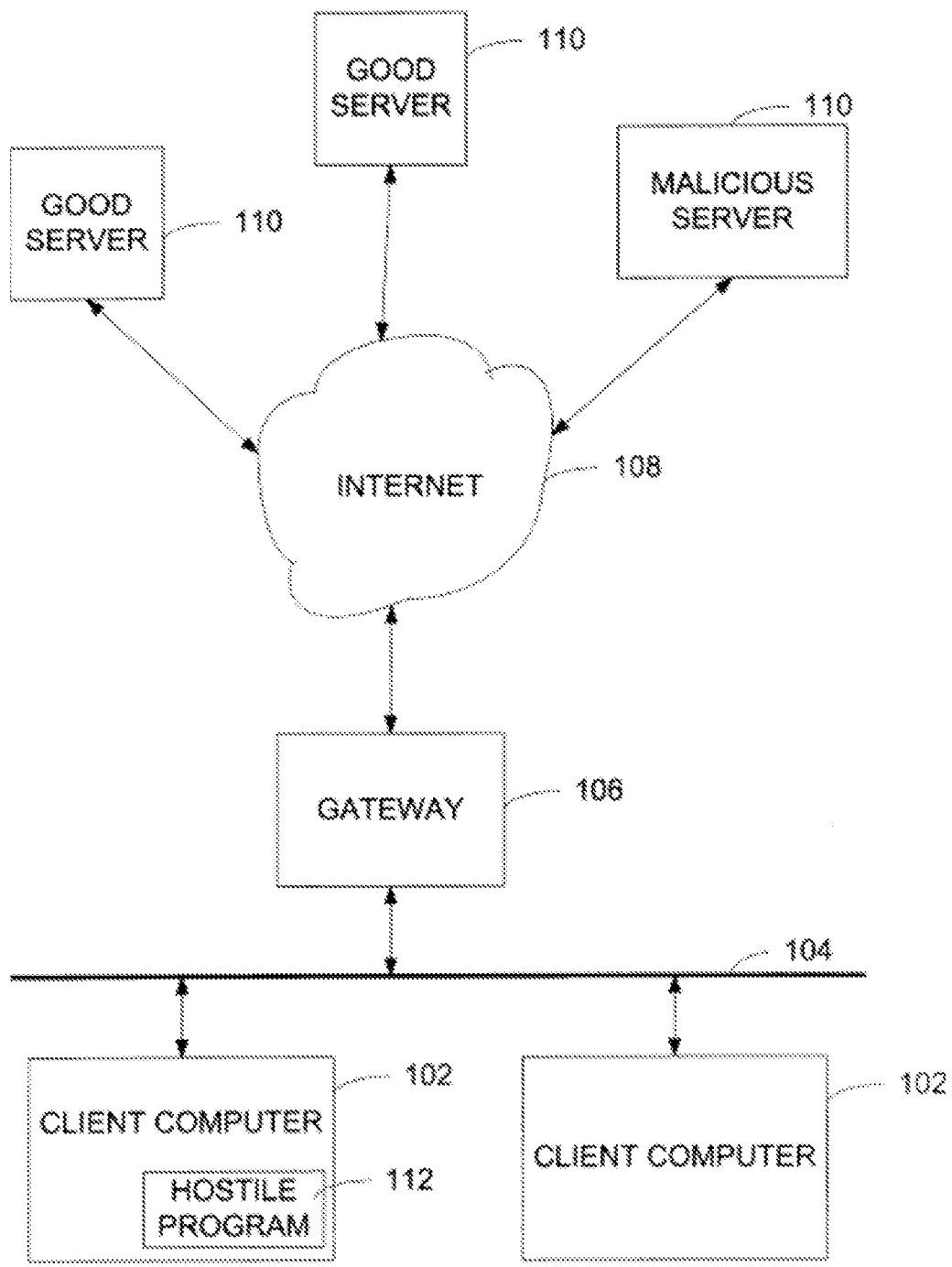
FIG. 1 illustrates a network connected across a wide area network (WAN) to one or more servers.

A wide-area network (WAN) 100 is shown in FIG. 1. In the WAN 100 of FIG. 1, one or more client computers 102 are connected through a local area network 104 to a gateway 106, and through gateway 106 to Internet 108. Client computers 102 communicate with servers 110 through Internet 108.

In the embodiment shown, one or more servers 110 contain malicious program code, such as Adware, spyware or malware. A server that contains, or is addressed by, malicious program code will be termed a "malicious" server.

As noted above, when malicious program code such as Adware or Spyware sends data back to a server embedded into an HTTP data upload request, the upload is not distinguishable from a regular HTTP data upload request, such as, for example, when using a Search form on a web page.

In the embodiment shown, one of the client computers 102 includes a hostile program 112. Hostile program 112 will attempt to send data back to malicious server 110.

For example, Spyware may send an HTTP request to its home servers that looks like this:

```
POST /emachine.asp HTTP/1.1
Accept: */*
Content-Type: application/x-www-form-urlencoded
X-UA: WinInet 6.0.2800.1106, 1.1, 1.0
User-Agent: Gator/7.0 RequestMachineInt
Host: gi.gator.com
Content-Length: 92
Connection: Keep-Alive
Cache-Control: no-cache
Field1=Q0QDJIKsJAAAAFgY%2b4Vmzen [...]
a%2fzZkvPxp7dhfnS9MIXRE%3d%3d%3d&
```

The intent of the base64-encoded data in the Field1 parameter is unknown. It may be "only" a request to download more software components, or it may as well be the uploading of just collected, potentially sensitive user-information.

A solution to the problem would be to be able to explicitly allow only "manual"/user-driven HTTP data uploads that, for example, originate from filling out and submitting a web form, so all other kinds of (potentially "unsolicited") HTTP data uploads can be blocked. This would not degrade the overall web browsing experience for most end-users, while on the other hand allowing users, e.g. network administrators, to gain more control over which data is sent out to the internet 108 via HTTP.

To solve the problem, one should try to determine whether an HTTP data upload originates from a "real", i.e., human, user. If not, it can be assumed that the upload is "unsolicited". One must accept that false-positives will occur in such a strict policy.

To work, a gateway 106 should be installed at the network perimeter, and all outgoing HTTP requests from the client computers 102 in the network 104 are directed to this gateway 106 and are to be served solely by this gateway. In one such embodiment, the "gateway" is a cluster of several gateway instances.

HTTP POST requests will be discussed first.

HTTP data uploads triggered by a "real" user originate primarily from HTML web forms used by the web page that the user visits. For example:

```
<html>
  ...
  <form method="get" action="/cgi-bin/search.pl">
  <input type="text" name="searchExpression">
  ...
  <input type="submit" value="Search Now">
  </form>
  ...
```

As the web form is delivered to the requesting browser first, and then later, possibly on a different network connection, the user submits the form data, gateway 106 needs to know that the uploaded data belongs to a web page that it has delivered previously. With this association made, the gateway can assume that this is a real, user-driven browsing session, not just one single request potentially sent from a "background" application of which the user is not aware.

To achieve this, gateway 106 scans all HTML pages for web forms, changes the form's 'method' attribute to 'post' if required, and attaches a so-called "watermark" to each HTML form element. In one embodiment, the "watermark" is attached to the form element by adding a hidden input field to the form, as the browser will send such hidden fields back to gateway 106 later.

In one embodiment, the hidden input field uses an internal, as unique as possible, field name. The value of the hidden input field contains the actual watermark which will be verified by the gateway in a later transaction. Therefore, the watermark must contain enough information to verify that the uploaded data belongs to this (trusted) form. This includes, for example, (parts of) the URL of the web page on which the form was found, (parts of) the URL in the "action" attribute of the HTML form element, an optional gateway-maintained incremental counter and an optional timestamp of when the form has been "watermarked". The last two elements are useful if prevention of some kind of replay attack should be needed.

In one embodiment, the watermark also contains information about the form element's original 'method' attribute. The watermark value must be encrypted (with a symmetric, gateway-specific encryption key that is used on all gateways of an installation in case there's no sticky load balancing), base64-encoded and URL-encoded before storing it in the hidden input field. After modification, the form element may look for example like this:

```
<html>
  ...
  <form method="post" action="/cgi-bin/search.pl">
    <input type="hidden" name="-web.washer-__watermark"
      value="3oDwh [...]
hSQ7z==">
  <input type="text" name="searchExpression">
  ...
  <input type="submit" value="Search Now">
  </form>
  ...
```

This approach is not limited to any one language that may be used to present a web form or upload link to the user (e.g., the language could be something other than HTML), nor on the application protocol used to transmit it. For example, it can also be applied to HTML content in E-mails, with the only difference being that one may not want to include the watermark's incremental counter- and timestamp attributes, as the delay between adding the watermark and retrieving the associated HTTP data upload request would otherwise too often lead to expired watermarks.

In one embodiment, a watermark as described above is attached to the web form by adding it as a parameter to the URL in the form's "action" attribute, instead of or in addition to adding the watermark in a hidden input field.

Figure 3:
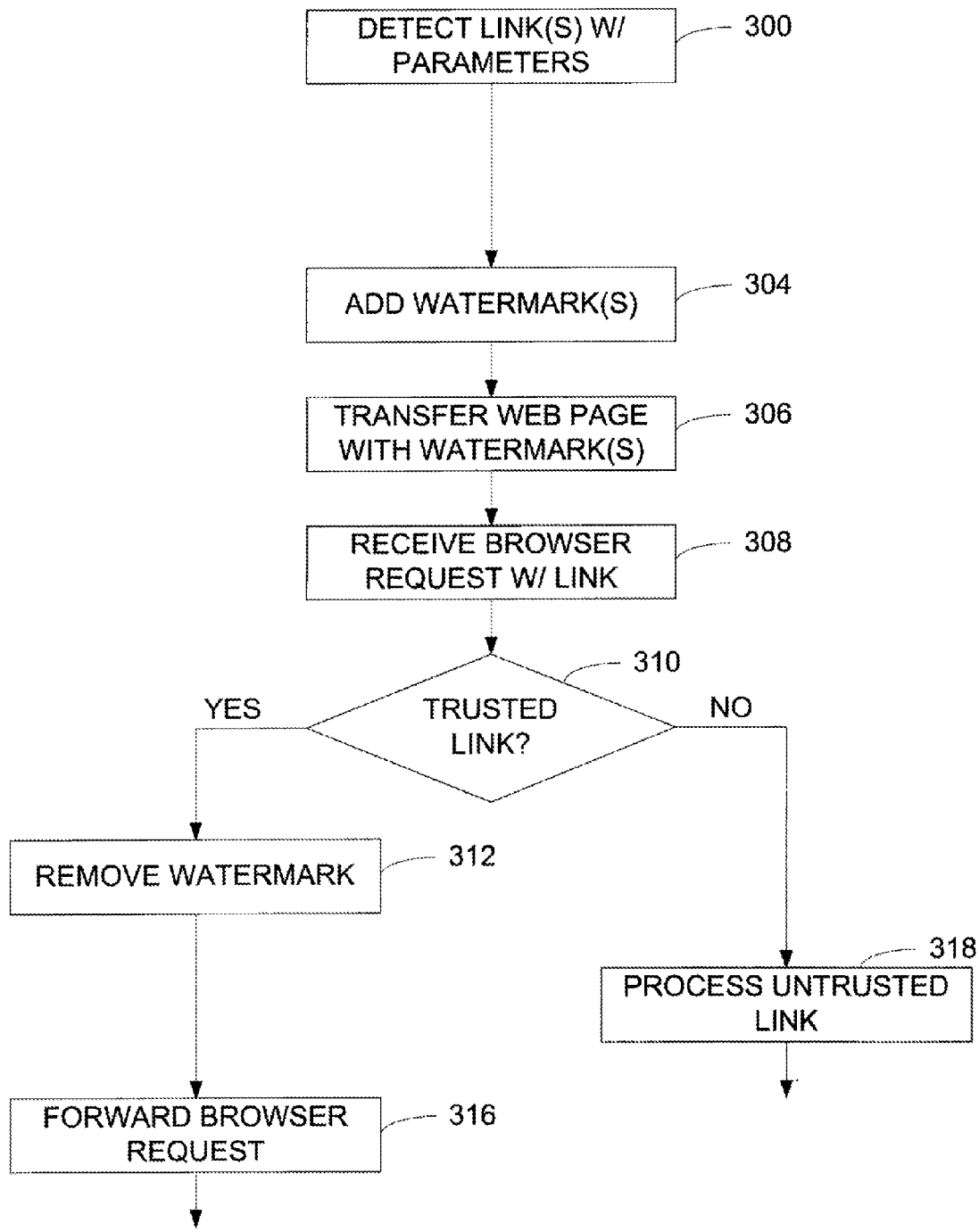
FIG. 3 illustrates a method of detecting unsolicited uploads via GET request.

In one embodiment, as shown in FIG. 3, gateway 106 can also scan the HTML pages for links (in 'href', 'src', . . . attributes) with parameters, and add the "watermark" as an additional parameter to the link URL.

Figure 2:
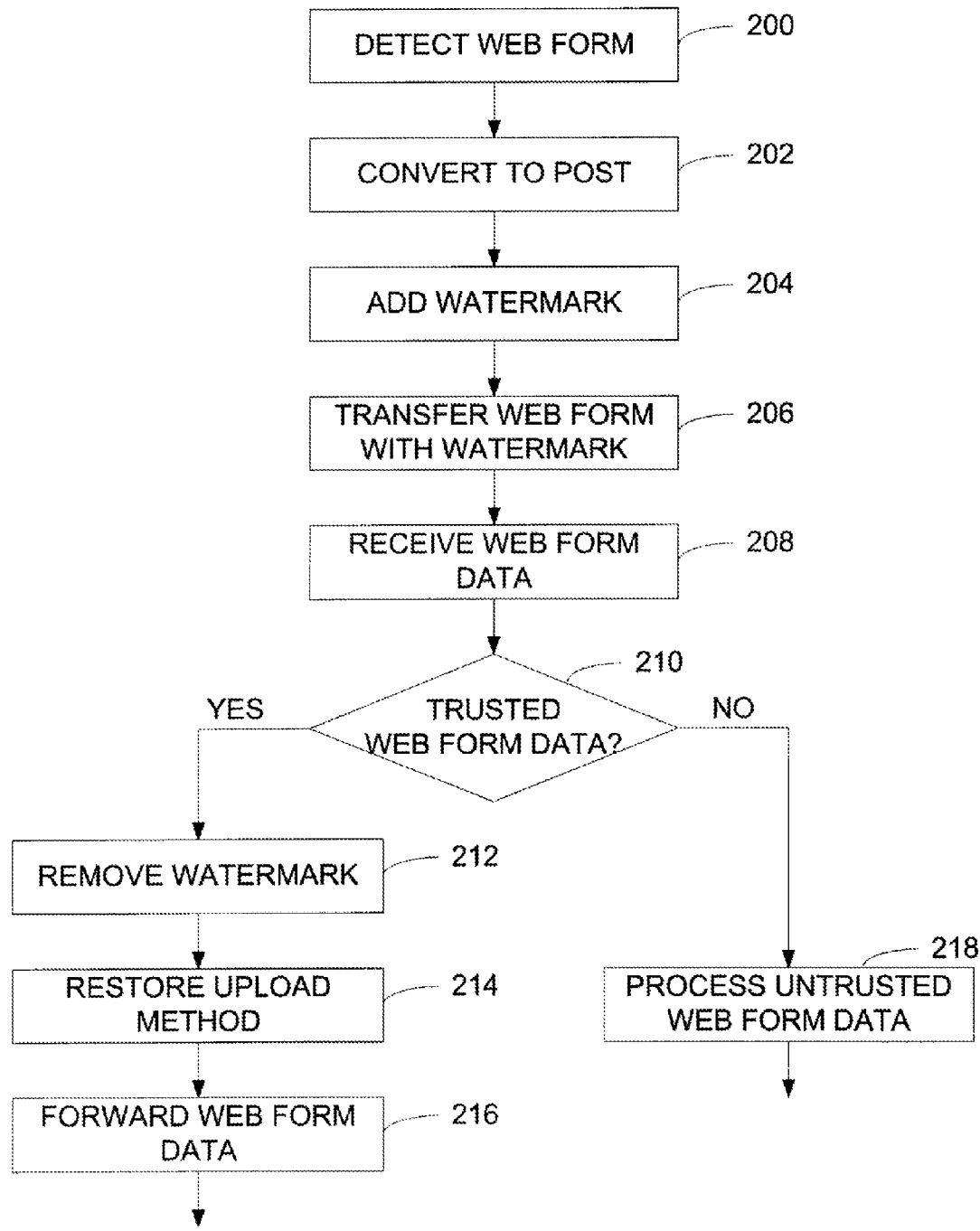
FIG. 2 illustrates a method of detecting unsolicited uploads via POST request.

An example embodiment of a method of limiting unsolicited data uploads is shown in FIG. 2. In the example shown in FIG. 2, gateway 106 scans all HTML pages for web forms at 200, changes the form's 'method' attribute to 'post' if required at 202, and adds a "watermark" to each HTML form element at 204. The "watermark" can be implemented by adding a hidden input field to the form, as the browser will send such hidden fields back to gateway 106 later.

When, at 206, the modified HTML page is delivered to the requesting browser, e.g. user, it still "looks" and behaves just like the original would have. When the user fills out the form and clicks a submit button, the browser sends back the entered form data including the hidden input fields, as an HTTP POST request. The gateway receives the web form data at 208 and verifies at 210 that the web form is likely from a human user. In one such embodiment, gateway 106 verifies, for instance, that all HTTP POST requests that may derive from HTML forms, e.g. with a content type of "application/x-www-form-urlencoded", "text/plain" or "multipart/form-data" contain a valid watermark.

If the HTTP POST request includes a valid watermark, the watermark is removed at 212 and the original upload method is restored at 214 (e.g. the HTTP POST request is converted into an HTTP GET request). The upload data is then forwarded at 216 to the intended target server.

If, however, the HTTP POST request does not include a valid watermark, control moves to 218 and the untrusted web form data is processed. If there's no valid watermark, this may indicate potential "Phone Home" activity on the client computer, and the gateway can, for example, block the request, or send a Warning page back to the client, or maintain a counter per client computer where the number of detected "Phone Home" activities is stored and then "quarantine" the client computer, e.g. block all its web access, if a threshold is exceeded.

In one embodiment, gateway 106 also verifies incoming HTTP GET requests that contain parameters in the Request URI. One such approach is shown in FIG. 3. To lower false-positives, in one embodiment, a URL filter database is used to limit checks for valid watermarks. For instance, if the requested site is either not categorized, or in a potentially affected category like 'Malicious Web Sites' or 'Spyware' of course, but also 'Private Homepages' or 'Web Hosting' for example, then the Request URI should be checked for a valid watermark.

In the method shown in FIG. 3, gateway 106 detects links having parameters at 300. Gateway 106 adds a "watermark" to each such link at 304. The "watermark" can be implemented by adding a parameter to the link, as the browser will send such parameters back to gateway 106 later.

When, at 306, the modified HTML page is delivered to the requesting browser, e.g. user, it still "looks" and behaves just like the original would have. When the user clicks on the link, the browser sends back the link parameters, including the parameter that contains the watermark, as a browser request. The gateway receives the browser request having the link at 308 and verifies at 310 that the link is likely initiated by a human user.

If the browser request includes a valid watermark, the watermark is removed at 312. The request is then forwarded at 316 to the intended target server.

If the parameters do not contain a valid watermark, the request can either be blocked at 318 or—to mitigate false-positives—, a valid watermark could be added to the Request URI and a warning page could be send back to the browser. In one such approach, the user receiving the warning page first has to confirm that he wants to do that request. Affirming the warning page will send the request again but this time with a valid watermark. Adware or Spyware programs won't be able to perform the human interaction that is needed to answer such a warning page.

Figure 4:
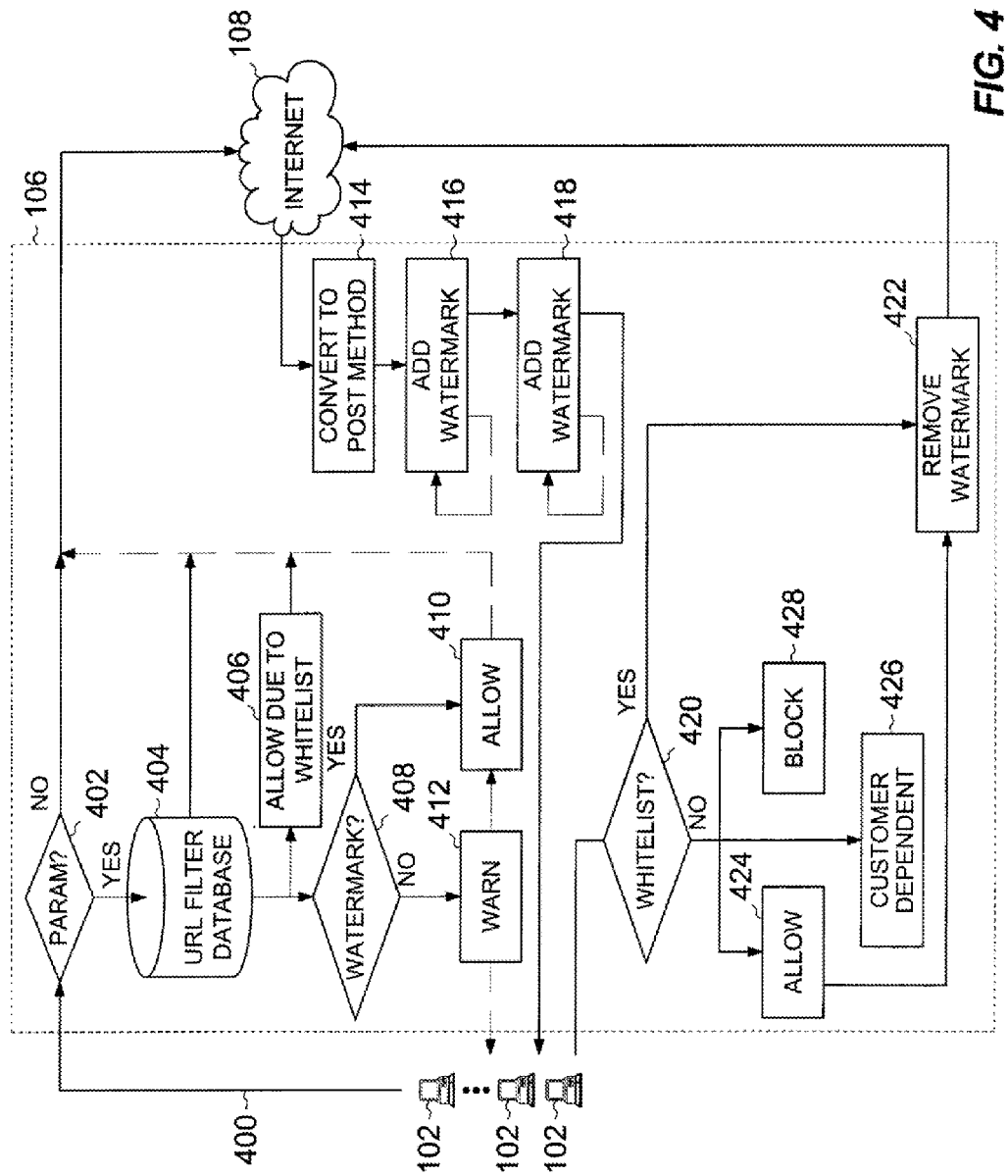
FIG. 4 illustrates an alternate method of detecting unsolicited uploads.

Another embodiment of a method of limiting data uploading by Spyware is shown in FIG. 4. In the example shown in FIG. 4, a user sends a request 400 (e.g. through the browser) for an HTML page. A check is made at 402 to determine if the request includes a Request URI having parameters. If not, the request is sent to the Internet.

If, however, the request URI for request 400 contains parameters, gateway 106 queries a URL filter database at 404 to determine if the requested site is categorized and in a non-suspicious category. If so, the request is sent to the Internet.

If, however, the check of the URL filter database at 404 determines that the requested site is categorized but is in a suspicious category, control moves to 406, where a check is made as to whether the request URI is whitelisted. If so, the request is sent to the Internet.

Similarly, if the check of the URL filter database determines that the requested site is not categorized, control moves to 406, where a check is made as to whether the request URI is whitelisted. If so, the request is sent to the Internet.

In the method of FIG. 4, if the requested site is either not categorized, or is in a potentially affected category like "Malicious Web Sites" or "Spyware", or even "Private Homepages" or "Web Hosting" (for example), then the Request URI should be checked for a valid watermark, unless the request URI has been whitelisted.

If the check at 406 determines that the request URI is not whitelisted, a check is made at 408 to determine if the Request URI includes a link parameter having a watermark. If so, control moves to 410, the watermark is removed and the request is sent to the Internet.

If the check at 408 determines that the Request URI does not include a link parameter having a watermark, or if the watermark is not valid, control moves to 412. If the parameters do not contain a valid watermark, the request can either be blocked or, to mitigate false-positives, a valid watermark could be added to the Request URI and a warning page could be send back to the browser. The user then has the opportunity to confirm that he wants to do that request.

Affirming the warning page will send the request again but this time with a valid watermark. Adware or Spyware programs won't be able to perform the human interaction that is needed to answer such a warning page.

Downloaded content (such as HTML pages) are checked at 414. For each form element found in the original downloaded content (e.g. HTML page), gateway 106 scans the form element, changes the form's 'method' attribute to 'post' if required at 414, and adds a "watermark" to each HTML form element at 416. In one embodiment, the watermark is a hidden input field added to each form element, containing a special value required later for verification as detailed above, as well as information about the original form method ("get" or "post"). As noted above, the "watermark" can be implemented by adding a hidden input field to the form, as the browser will send such hidden fields back to gateway 106 later.

Similarly, at 418, gateway 106 scans for links in the original downloaded content. If one or more links have parameters, gateway 106 adds a watermark parameter containing a watermark. As detailed above, the watermark is a special value required later for verification. The downloaded content is then delivered to the user.

When the modified downloaded content is delivered to the requesting browser, e.g. user, it still "looks" and behaves just like the original would have. When the user fills out the form and clicks a submit button, the browser sends back the entered form data including the hidden input fields, as an HTTP POST request. Gateway 106 receives the web form data and determines at 420 whether the upload target is whitelisted. If so, any watermark information is removed at 422 and the web form data is sent to the upload target.

If the upload target is not whitelisted, a check is made at 424 to determine whether the uploaded data is from a web form and whether the uploaded data has the watermark associated with that web form. If so, the watermark is removed at 422 and the form data is forwarded to the target web server. If the original form method was a "get", then the request is sent as an HTTP GET request instead of an HTTP POST request.

If, however, the upload target is not whitelisted and the uploaded data is not from a web form, control moves to 426 and gateway 106 can, for example, allow the request, block the request, or send a Warning page back to the client. In addition, in one embodiment, gateway 106 maintains a counter per client computer 102 where the number of detected "Phone Home" activities is stored and then "quarantines" the client computer 102, e.g. block all its web access, if a threshold is exceeded.

If the upload target is not whitelisted and the uploaded data is from a web form but the uploaded data does not have a valid watermark, control moves to 428 and gateway 106 can, for example, block the request or send a Warning page back to the client. In addition, in one embodiment, gateway 106 maintains a counter per client computer 102 where the number of detected "Phone Home" activities is stored and then "quarantines" the client computer 102, e.g. block all its web access, if a threshold is exceeded.

The above-described solution is generic and preventive, as it works equally for any Potentially Unwanted Program that may send data from an infected client computer to the internet via HTTP. This approach can handle new Adware/Spyware variants without requiring any update to the process, signatures or the like. In addition, the above solution is transparent to the end-user (except in case HTTP GET data upload requests are verified, too, and a Warning page is used), and has no (visible) impact to the user's web browsing experience.

The above solution is helpful to network administrators, as they can get (E-mail) notifications whenever a potentially infected client computer has been identified by this solution, so they can clean the infection in general instead of only blocking the infection's outbound communications. In addition, the solution is easy to maintain for network administrators, as it will yield only a relatively low number of false-positives ('low' if only HTTP POST requests are verified, maybe 'medium' if also HTTP GET requests are verified).

Finally, the solution is easy to maintain for the gateway 106 vendor. Once completely implemented, the approach doesn't need frequent updates to the code, and it doesn't need signatures or rules at all.

As noted above, an important aspect of this invention is the detection of whether an HTTP data upload request belongs to a "real", interactive browsing session initiated by a human user, and not just one single request sent out by a "background" application like an Ad- or Spyware. HTTP requests that have been determined as being user-driven are treated as trustworthy, while all other HTTP uploads can then be assumed to be suspicious or potentially unwanted.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The invention claimed is:

1. A machine readable medium, on which are stored instructions for limiting unsolicited data uploads over a network, comprising instructions that when executed cause a gateway to:
   detect a web form contained in a file, wherein the file is an email or a web page downloaded by a user device;
   attach a watermark to the web form to form a trusted web form responsive to detecting the web form, wherein the watermark includes enough data to verify that data uploaded via the web form belongs to the trusted web form;
   transfer the file containing the trusted web form to the user device;
   receive uploaded web form data at the gateway from the user device;
   determine that the uploaded web form data originated from a human responsive to the uploaded web form data including the watermark of the trusted web form;
   determine that the uploaded web form data is unsolicited web form data responsive to the uploaded web form data not including the watermark of the trusted web form; and
   allow transfer of only uploaded web form data that originated from a human.

2. The machine readable medium of claim 1, wherein the watermark includes portions of an address of a web page where the web form was found.

3. The machine readable medium of claim 1, wherein the watermark includes portions of an address of a web page stored in an action attribute in the web form.

4. The machine readable medium of claim 1, wherein the watermark includes a timestamp.

5. The machine readable medium of claim 1, wherein the watermark includes an integer generated by a counter.

6. The machine readable medium of claim 1, wherein the watermark includes a timestamp.

7. The machine readable medium of claim 1, wherein the watermark includes an integer generated by a counter.

8. The machine readable medium of claim 1, wherein the instructions that when executed cause the gateway to attach a watermark comprise instructions that when executed cause the gateway to:
   add a hidden input field to the web form;
   encrypt the watermark; and
   store the encrypted watermark in the hidden input field.

9. The machine readable medium of claim 1, wherein the instructions that when executed cause the gateway to attach a watermark comprise instructions that when executed cause the gateway to:
   add a hidden input field to the web form;
   encode the watermark using base64 and URL encoding; and
   store the encoded watermark in the hidden input field.

10. The machine readable medium of claim 1,
   wherein the instructions that when executed cause the gateway to attach a watermark comprise instructions that when executed cause the gateway to:
      change a web form method attribute to post, and
   wherein the instructions that when executed cause the gateway to remove the watermark comprise instructions that when executed cause the gateway to:
      restore an original upload method of the web page.

11. The machine readable medium of claim 1, wherein the instructions that when executed cause the gateway to attach a watermark comprise instructions that when executed cause the gateway to:
   add a parameter to a URL stored in an action attribute of the web form;
   encrypt the watermark; and
   store the encrypted watermark in the added parameter.

12. The machine readable medium of claim 1, wherein the instructions that when executed cause the gateway to attach a watermark comprise instructions that when executed cause the gateway to:
   add a parameter to a URL stored in an action attribute of the web form;
   encode the watermark using base64 and URL encoding; and
   store the encoded watermark in the added parameter.

13. The machine readable medium of claim 1, wherein the watermark includes information about an original method attribute of the web form.

14. The machine readable medium of claim 1, wherein the instructions that when executed cause the gateway to allow transfer of only uploaded web form data that originated from a human comprise instructions that when executed cause the gateway to send a warning message to the user device, indicating that the uploaded web form data does not include the watermark of the trusted web form.

15. The machine readable medium of claim 14, wherein the instructions that when executed cause the gateway to send a warning message comprise instructions that when executed cause the gateway to send a valid watermark for the trusted web form to the user device.

16. The machine readable medium of claim 15, further comprising instructions that when executed cause the gateway to receive a confirmation including the valid watermark from the user device.

17. The machine readable medium of claim 1, wherein the instructions that when executed cause the gateway to allow transfer only of uploaded web form data that originated from a human by the gateway comprise instructions that when executed cause the gateway to:
  increment a counter associated with the user device responsive to determining that the uploaded web form data does not include the watermark of the trusted web form; and
  block all web access from the user device responsive to the counter exceeding a threshold number.

18. A machine readable medium, on which are stored instructions for limiting unsolicited data uploads over a network, comprising instructions that when executed cause a gateway to:
  scan content downloaded by a user device for links having one or more parameters;
  add a watermark to a link to form a trusted link responsive to detecting the link in the downloaded content, wherein the instructions that when executed cause the gateway to add a watermark comprise instructions that when executed cause the gateway to:
    add a link parameter to the link; and
    store a watermark in the added link parameter, wherein the watermark includes enough data to verify that data uploaded via the link belongs to the trusted link;
  transfer the trusted link to the user device;
  receive a browser request from the user device as a function of the trusted link;
  determine that the browser request was initiated by a human responsive to the browser request including the watermark of the trusted link; and
  require user confirmation that the browser request was intentional before forwarding the browser request responsive to the browser request not determined as initiated by a human.

19. The machine readable medium of claim 18, wherein the watermark comprises one or more of:
  portions of an address of a web page where the link was found;
  a timestamp;
  an integer generated by a counter;
  a timestamp; and
  an integer generated by a counter.

20. The machine readable medium of claim 18, wherein the instructions that when executed cause the gateway to add a watermark further comprise instructions that when executed cause the gateway to:
  encrypt the watermark.

21. The machine readable medium of claim 18, wherein the watermark is encrypted, base64-encoded and URL-encoded before being stored in the added link parameter.

22. A gateway, comprising:
  a network interface;
  a processor, coupled to the network interface;
  a memory, coupled to the processor, on which are stored instructions, comprising instructions that when executed cause the processor to:
    receive a web page and add a watermark to content within the web page to form a modified web page responsive to receiving the web page;
    transfer the modified web page to a user device;
    receive information from the user device;
    determine that the received information originated from a human responsive to the received information including the watermark of the trusted web form;
    determine that the received information is unsolicited web form data not originating from a human responsive to the uploaded web form data not including the watermark of the trusted web form; and
    only allow transfer of received information originating from a human.

23. The gateway of claim 22, wherein the web page includes web forms and wherein the watermark is added as a parameter to a URL stored in an action attribute of the web form.

24. The gateway of claim 22, wherein the web page includes one or more links and wherein the watermark is added as a link parameter.

25. The gateway of claim 22,
  wherein the instructions that when executed cause the processor to receive a web page comprise instructions that when executed cause the processor to extract a web page from an email, and
  wherein the instructions that when executed cause the processor to transfer the modified web page to a user device comprise instructions that when executed cause the processor to insert the modified web page back into the email.

* * * * *